(12) United States Patent
Peng et al.

(10) Patent No.: US 6,546,159 B1
(45) Date of Patent: Apr. 8, 2003

(54) METHOD AND APPARATUS FOR COMPENSATING DIFFERENTIAL GROUP DELAY

(75) Inventors: Song Peng, Pleasanton, CA (US); Ming Li, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/225,650

(22) Filed: Aug. 22, 2002

Related U.S. Application Data

(60) Provisional application No. 60/314,352, filed on Aug. 22, 2001.

(51) Int. Cl.$^7$ .......................... G02B 6/00; G02F 1/141; G02F 1/1347; G02F 1/335; G01J 1/20
(52) U.S. Cl. .................. 385/11; 356/399; 250/201.4; 349/77
(58) Field of Search .................. 385/4, 11, 12, 385/14, 147; 356/399, 400, 401; 250/201.4, 548, 201.2, 201.7; 349/77, 100, 117, 106, 196, 57, 172

(56) References Cited

U.S. PATENT DOCUMENTS

| | | | | |
|---|---|---|---|---|
| 4,548,478 A | * | 10/1985 | Shirasaki | 359/256 |
| 5,191,200 A | * | 3/1993 | van der Werf et al. | 250/201.4 |
| 5,847,790 A | * | 12/1998 | Andersson et al. | 349/100 |
| 6,130,731 A | * | 10/2000 | Andersson et al. | 349/100 |

* cited by examiner

*Primary Examiner*—Akm E. Ullah
(74) *Attorney, Agent, or Firm*—Sawyer Law Group LLP

(57) ABSTRACT

An improved digital differential group delay (DGD) controller is capable of producing variable DGD used to compensate for DGD in a fiber optic link in real time. The DGD controller comprises one or more sets of a polarization modulator optically coupled with a fixed delay component, such as a birefringent plate. Each set provides an amount of DGD compensation. By controlling the number of stages in the controller, the amount of DGD compensation provided by each stage, and which stages are placed in the ON state, the total amount of DGD compensation provided by the digital DGD controller can be varied.

22 Claims, 9 Drawing Sheets

800

METHOD AND APPARATUS FOR COMPENSATING DIFFERENTIAL GROUP DELAY

CROSS-REFERENCE TO RELATED APPLICATIONS

This application claims priority under 35 U.S.C. § 119(e) the benefit of U.S. Provisional Patent Application Serial No. 60/314,352, entitled "Method and Apparatus For Compensating Differential Group Delay," filed on Aug. 22, 2001.

FIELD OF THE INVENTION

The present invention relates to polarization mode compensators in optical communications systems.

BACKGROUND OF THE INVENTION

Within each link in a fiber optic communications system, different polarizations of an optical signal traversing the link may travel at different speeds. This effect is called polarization mode dispersion (PMD). The timing difference between two principal states of polarization is called the differential group delay (DGD). Polarization mode dispersion causes the broadening of optical pulses, which is detrimental to signal quality in high bit rate transmission. Making the matter more complex, DGD generally varies as a function of time in a given link.

Conventionally, a fixed DGD compensator is placed at the end of the link to reduce the PMD effect. However, if conditions on the link change, the fixed DGD compensator is not able to change the amount of compensation without being replaced with a different DGD compensator. This method of DGD compensation does not allow for real time DGD compensation and is thus inflexible.

Accordingly, there exists a need for an improved DGD compensator. The improved compensator should be tunable, thus producing variable DGD compensation. The improved compensator should allow for real time DGD compensation. The present invention addresses such a need.

SUMMARY OF THE INVENTION

An improved digital differential group delay (DGD) controller is capable of producing variable DGD used to compensate for DGD in a fiber optic link in real time. The DGD controller comprises one or more sets of a polarization modulator optically coupled with a fixed delay component, such as a birefringent plate. Each set provides an amount of DGD compensation. By controlling the number of stages in the controller, the amount of DGD compensation provided by each stage, and which stages are placed in the ON state, the total amount of DGD compensation provided by the digital DGD controller can be varied.

DETAILED DESCRIPTION

The present invention provides an improved differential group delay compensator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a digital differential group delay (DGD) controller this is capable of producing variable DGD. The variable DGD is used to compensate for DGD in a fiber optic link in real time. The DGD controller comprises one or more sets of a polarization modulator optically coupled with a fixed delay component, such as a birefringent plate. Each set provides an amount of DGD compensation. By controlling the number of stages in the controller, the amount of DGD compensation provided by each stage, and which stages are placed in the ON state, the total amount of DGD compensation provided by the digital DGD controller can be varied.

To more particularly describe the features of the present invention, please refer to FIGS. 1 through 9 in conjunction with the discussion below.

Figure 1:
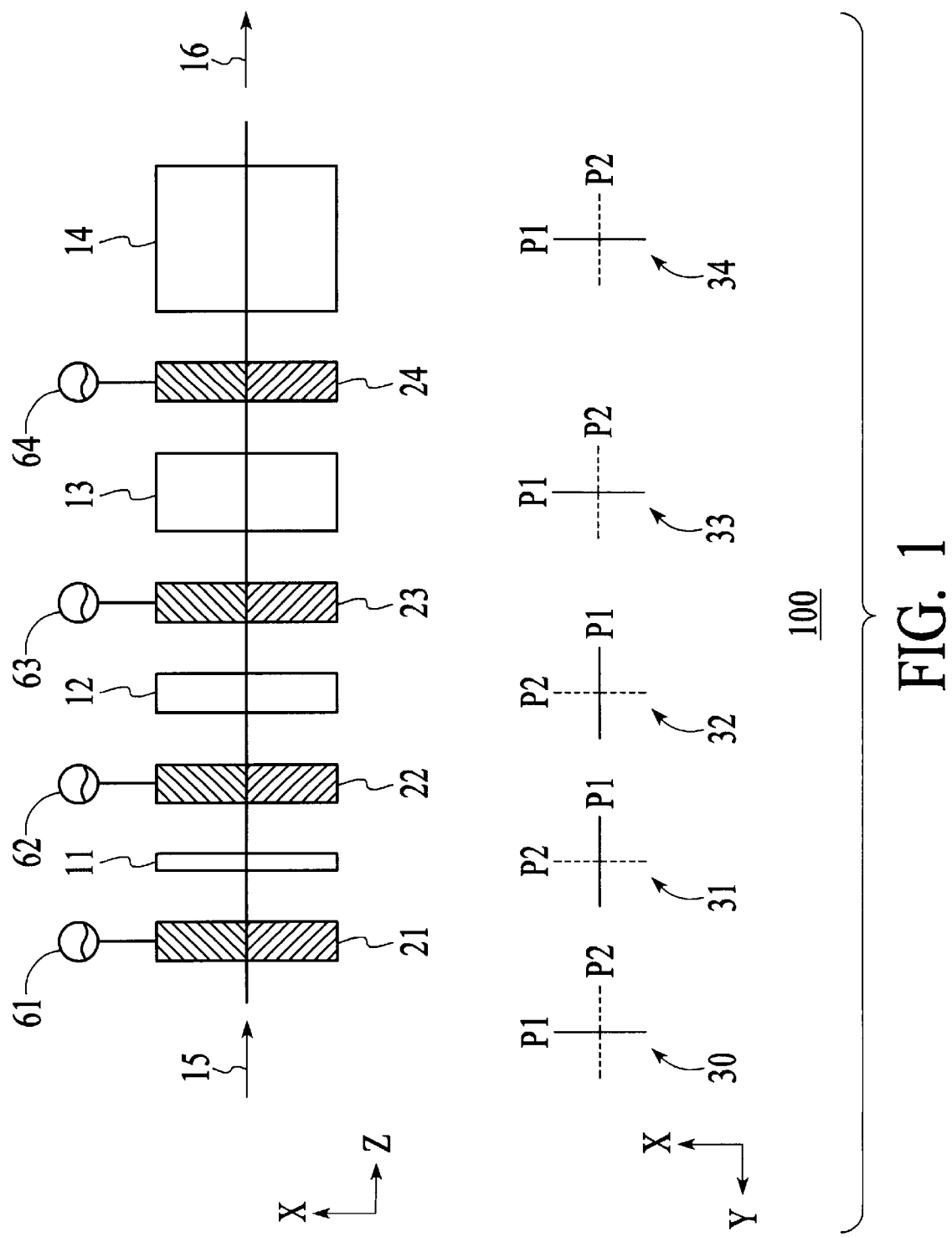
FIG. 1 illustrates a first preferred embodiment of a digital differential group delay compensator in accordance with the present invention.

FIG. 1 illustrates a first preferred embodiment of a digital differential group delay compensator in accordance with the present invention. The digital DGD compensator 100 has one or more stages comprising polarization modulators 21, 22, 23, and 24 and birefringent plates 11, 12, 13, and 14. Each set of polarization modulator and birefringent plate comprises a stage. For example, the polarization modulator 21 and the birefringent plate 11 comprises the first stage of the digital DGD compensator 100. Similarly, the polarization modulators 22, 23, and 24 and the birefringent plates 12, 13, and 14, respectively, comprise the subsequent stages of the digital DGD compensator 100. Each of the polarization modulators 21–24 may assume either an ON state or an OFF state, depending upon the bias of its corresponding electrical control signal 61–64. In the ON state, the polarization modulators 21–24 rotate a polarization of an input beam 15 by 90 degrees. In the OFF state, the polarization of the input beam 15 is not rotated.

In the first preferred embodiment, the polarization modulators 21–24 are each comprised of a twisted-nematic liquid crystal device. However, other types of polarization modulators can be used, such as ferroelectric liquid crystal, magneto-optical polarization modulators, and mechanically rotated half-waveplates. In the first preferred embodiment, the birefringent plates 11–14 are each comprised of birefringent crystals such as calcite. However, other materials may be used.

For the purpose of this discussion, the "fast" axis of each birefringent plate 11–14, i.e., the direction along which a principle state of polarization (PSP) travels at a faster speed, is aligned along the x-axis. The "slow" axis of each birefringent plate 11–14, i.e., the direction along which a PSP travels at a slower speed, is aligned along the y-axis, as illustrated in FIG. 1. The DGD that can be generated by the $i^{-th}$ stage birefringent plate, $\delta_i$, is linearly proportional to its thickness according to the following equation:

$$\delta_i = \frac{(n_y - n_x)d_i}{C} \quad \text{(Eq. 1)}$$

where $d_i$ is the thickness of the birefringent plate of the $i^{-th}$ stage, C is the speed of light in a vacuum, and $n_x$ and $n_y$ are the indices of refraction for the x and y polarizations, respectively. Because the fast axis is aligned along the x direction, $n_y$ is always greater than $n_x$. For example, for $n_y - n_x = 0.2$, to generate one pico second (ps) of DGD, the required thickness of the birefringent plate would be approximately 1.5 mm.

The thickness of the birefringent late $i^{-th}$ in the stage is chosen according to the following equation:

$$d_i = 2^{i-1} d_1 \quad \text{(Eq. 2)}$$

where $d_1$, is the thickness of the first stage birefringent plate 11. The $i^{th}$ stage will be able to add $\pm 2^{i-1} \delta_1$ to the total DGD depending on the state of the polarization modulator of the $i^{th}$ stage, where $\delta_1$ is the DGD of the first stage birefringent plate 11. With n stages, a variable DGD in the range between $\delta_1$ and $(2^n-1)\delta_1$, with an increment of $2\delta_1$, can be achieved.

An example of a $9\delta_1$ delay between PSPs, P2 and P1, is illustrated in diagrams 30–34 of FIG. 1. Assume that the polarization modulators 61–64 are each in the ON state. P1 and P2 of the input beam 15 are indicated by diagram 30 where P1 is in the x direction and P2 is in the y direction. Polarization modulator 11 rotates P1 and P2 by 90 degrees, thus, P2 is aligned with the fast axis of the first birefringent plate 11, as indicated by diagram 31. After passing through the first birefringent plate 11, a delay of $-\delta_1$ is added to P2 relative to P1. Following diagrams 32 through 34, a delay of $-2\delta_1$, $+4\delta_1$, and $+8\delta_1$ are added to P2 relative to P1 by birefringent plates 12, 13, and 14, respectively. The total delay of P2 relative to P1 is thus $+9\delta_1$. The total delay can be changed by changing one or more of the polarization modulators 61–64 to the OFF state, which can be done in real time.

Figure 2:
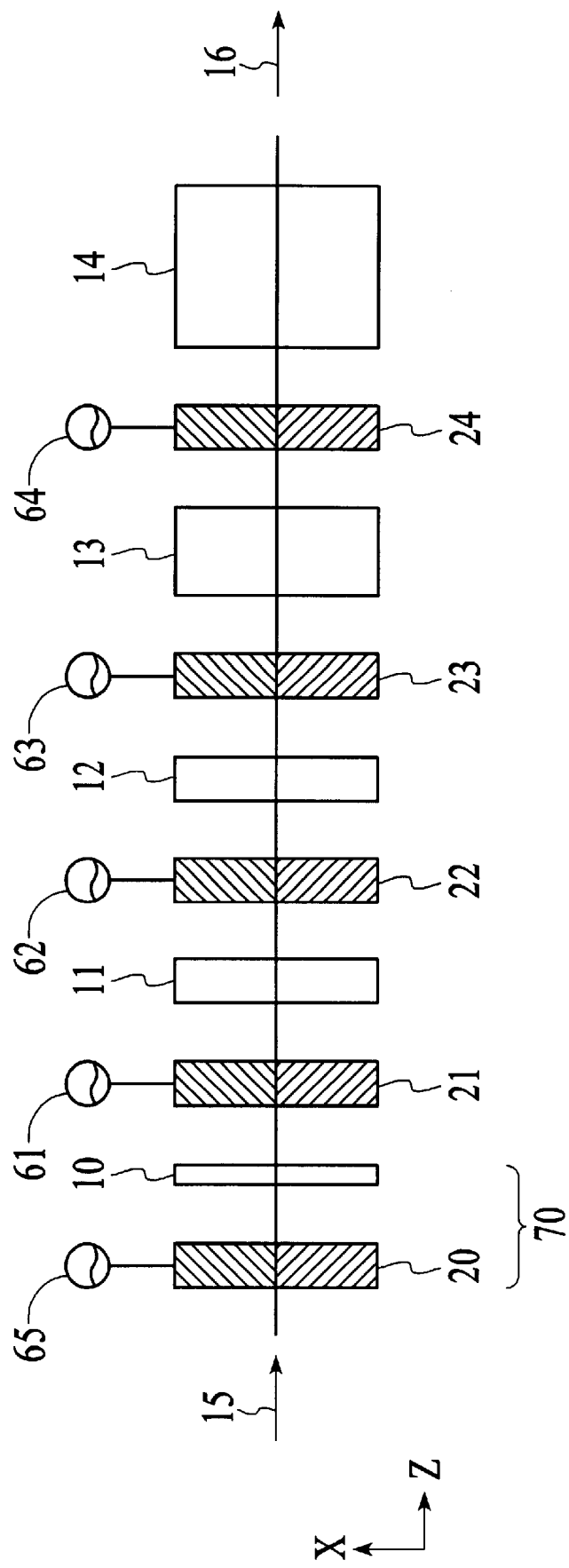
FIG. 2 illustrates a second preferred embodiment of the digital DGD controller in accordance with the present invention.

FIG. 2 illustrates a second preferred embodiment of the digital DGD controller in accordance with the present invention. The digital DGD controller 200 comprises the same elements as the controller 100, with an additional offset stage 70 optically coupled to the first polarization modulator 21 at a side opposite to the birefringent plate 11. The offset stage 70 comprises a birefringent plate 10 optically coupled to the polarization modulator 21, and a polarization modulator 20 with an electrical control signal 65 optically coupled to the birefringent plate 10 at a side opposite to the polarization modulator 21. The birefringent late 10 is identical to the birefringent plate 11, thus it also provides a DGD of $\delta_1$. Thus, by controlling the polarization modulator 20, an additional DGD of $\pm\delta_1$ may be added to the total DGD. With the offset stage 70, the n-stage (including the offset stage) DGD controller 200 can provide variable DGD in the range between 0 and $2^{n-1}\delta_1$ with an increment of $\delta_1$.

Figure 3:
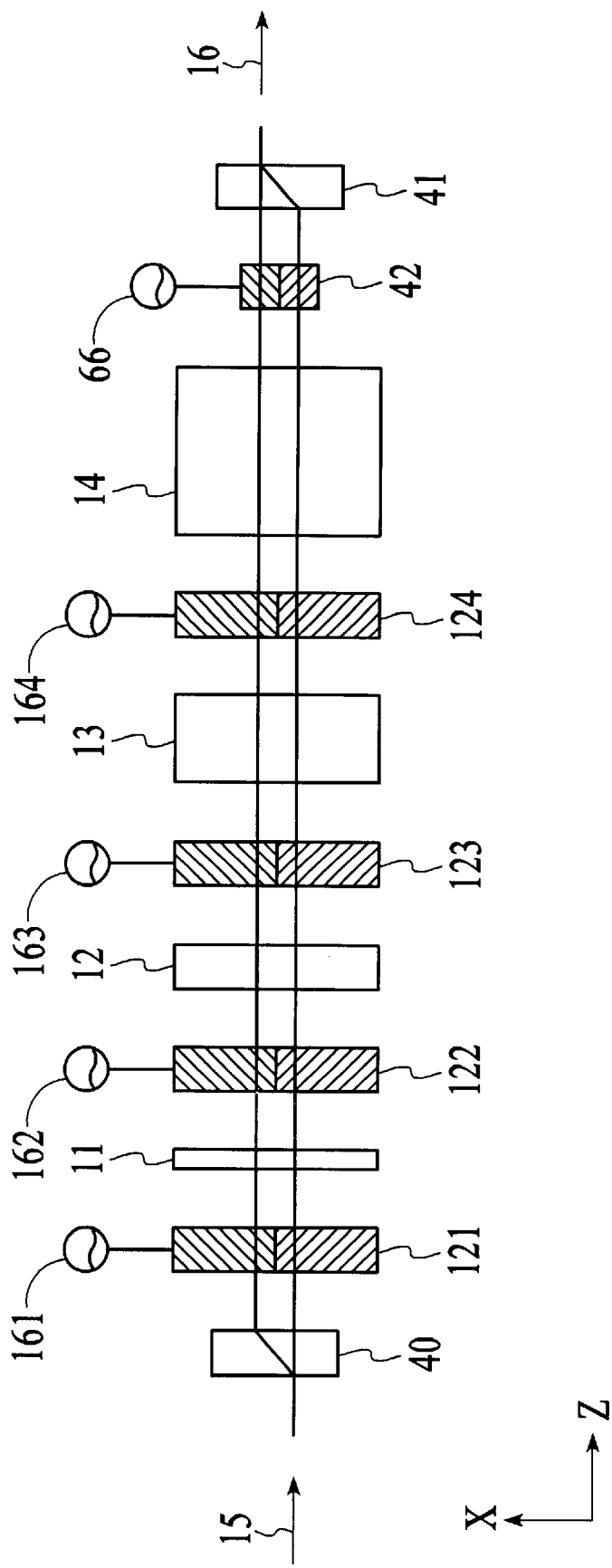
FIG. 3 illustrates a third preferred embodiment of the digital DGD controller in accordance with the present invention.

FIG. 3 illustrates a third preferred embodiment of the digital DGD controller in accordance with the present invention. The digital DGD controller 300 comprises the polarization modulators 121–124, each divided into two pixels, with electronic control signals 161–164, respectively, configured to be independently controlled. The controller 300 further comprises the birefringent plates 11–14, a birefringent polarization beam displacer 40 optically coupled to the polarization modulator 121 at a side opposite to the birefringent plate 11, a polarization modulator 42 with an electric control signal 66 optically coupled to the birefringent plate 14 at a side opposite to the polarization modulator 124, and a polarization beam displacer 41 optically coupled to the polarization modulator 42 at a side opposite to the birefringent plate 14. The displacer 40 spatially separates the two PSPs. If the two polarizations are aligned in the same direction, a birefringent plate 11, 12, 13, or 14 produce zero DGD. The controller 300 can provide DGD in finer increments than the controllers 100 or 200. The combination of the polarization modulator 42 and the polarization beam displacer 41 ensure that the two PSPs are recombined into a single output beam 16.

Figure 4:
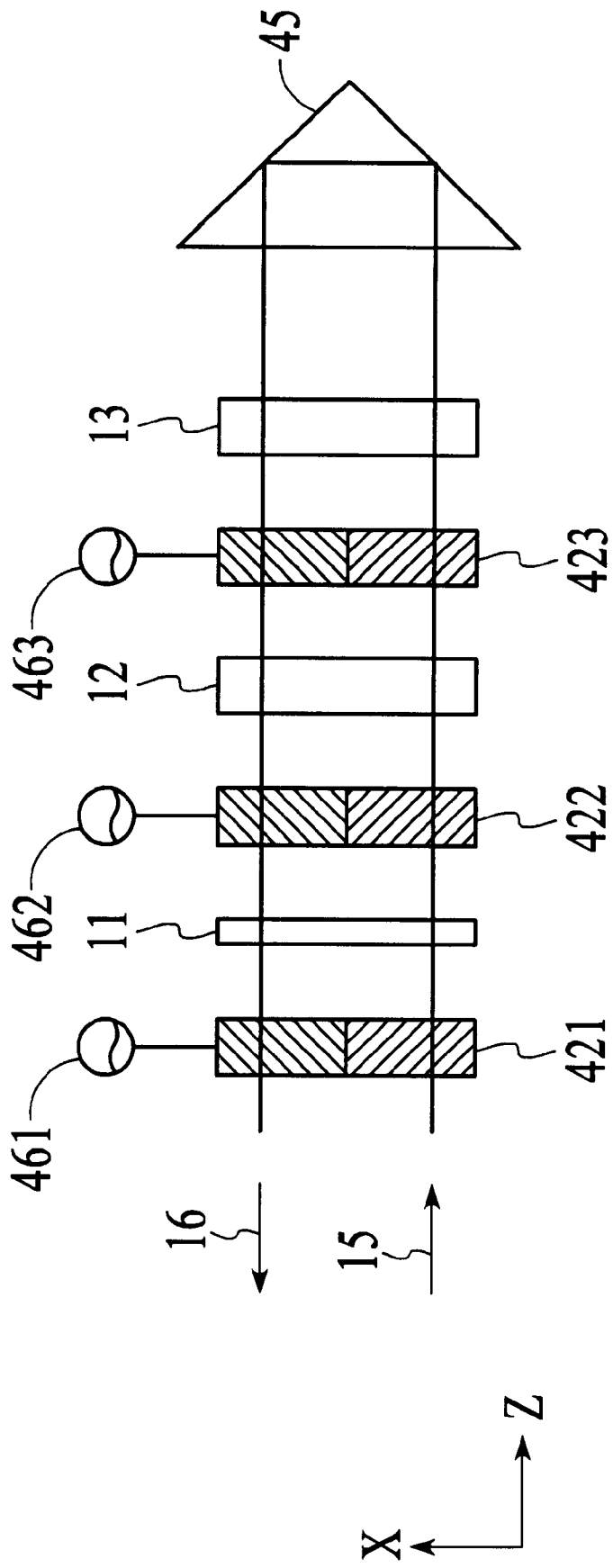
FIG. 4 illustrates a fourth preferred embodiment of the digital DGD controller in accordance with the present invention.

FIG. 4 illustrates a fourth preferred embodiment of the digital DGD controller in accordance with the present invention. The digital DGD controller 400 comprises polarization modulators 421–423, each divided into two pixels, with electric control signals 461–463, configured to be independently controlled. The controller 400 further comprises birefringent plates 11–13 and a reflector 45 optically coupled to the birefringent plate 13. In this embodiment, the reflector 45 is a right-angle prism, which folds the optical path of the input beam 15. The input beam 15 passes through one pixel of each of the polarization modulators 421, 422, 423 and the birefringent plates 11, 12, 13. Then, the input beam 15 is reflected by the reflector 45 back through the birefringent plates 13, 12, 11 and the other pixel of each of the polarization modulators 423, 422, 421, resulting in the output beam 16. With this configuration, the input beam 15 passes through each birefringent plate 11–13 twice. Thus, the size of the controller 400 is reduced.

Figure 5:
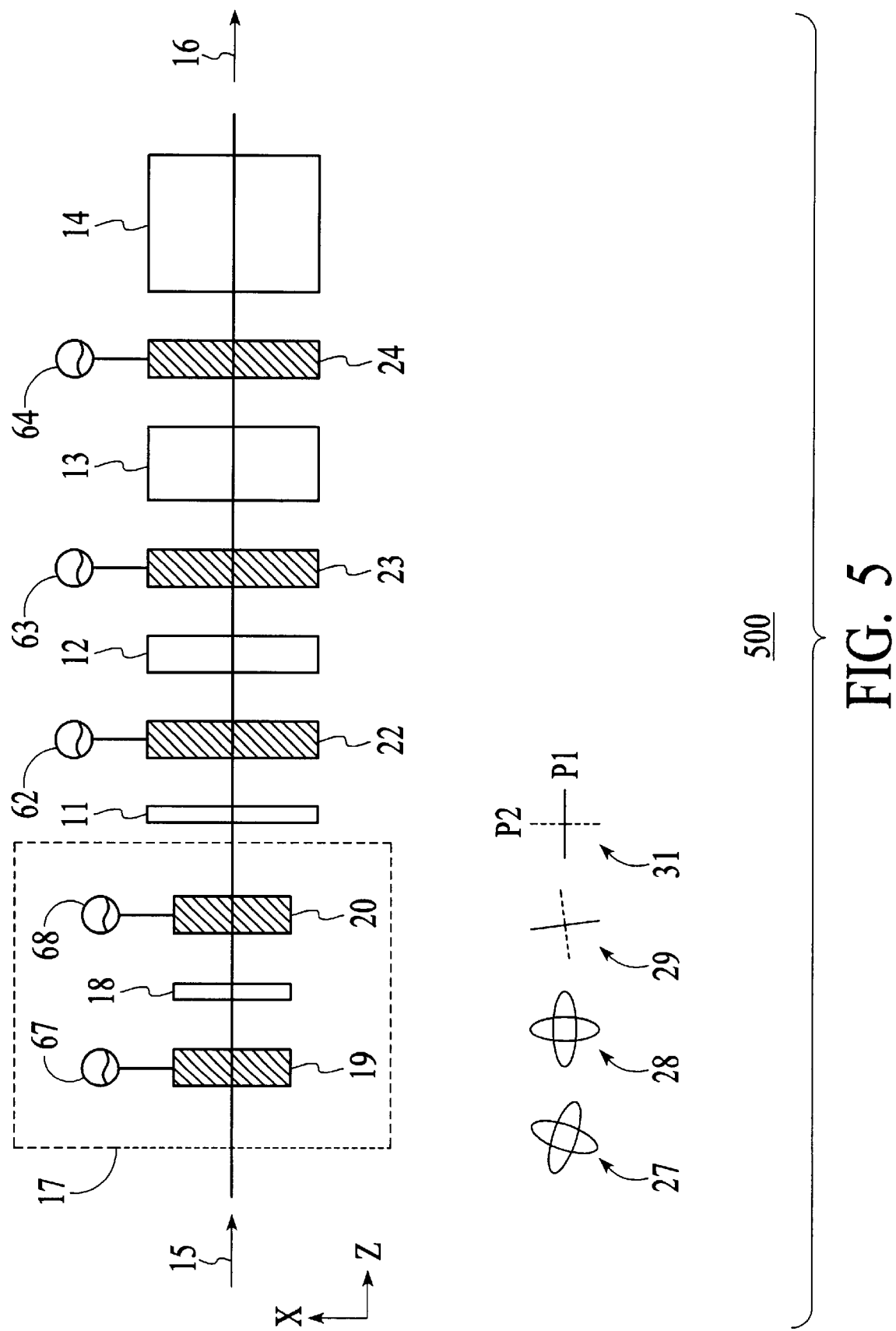
FIG. 5 illustrates a fifth preferred embodiment of the digital DGD controller in accordance with the present invention.

FIG. 5 illustrates a fifth preferred embodiment of the digital DGD controller in accordance with the present invention. The digital DGD controller 500 comprises the polarization modulators 22–24 with electric control signals 62–64, respectively, and the birefringent plates 11–14. The controller further comprises a polarization modulator 17 that comprises a polarization modulator 19 with electric signal 67, a quarter-wave waveplate 18, and a polarization modulator 20 with electric control signal 68. This polarization modulator 17 transforms the PSPs, which are generally elliptically polarized as shown in diagram 27, into linear polarizations. The polarization modulator 19 aligns the input PSPs with x and y axes, as shown in diagram 28. The quarter-wave waveplate 18 then converts the elliptical polarizations into linear polarizations, as shown in diagram 29. The polarization modulator 20 then rotates the linear polarizations to the x and y axes, as shown in diagram 31.

Figure 6:
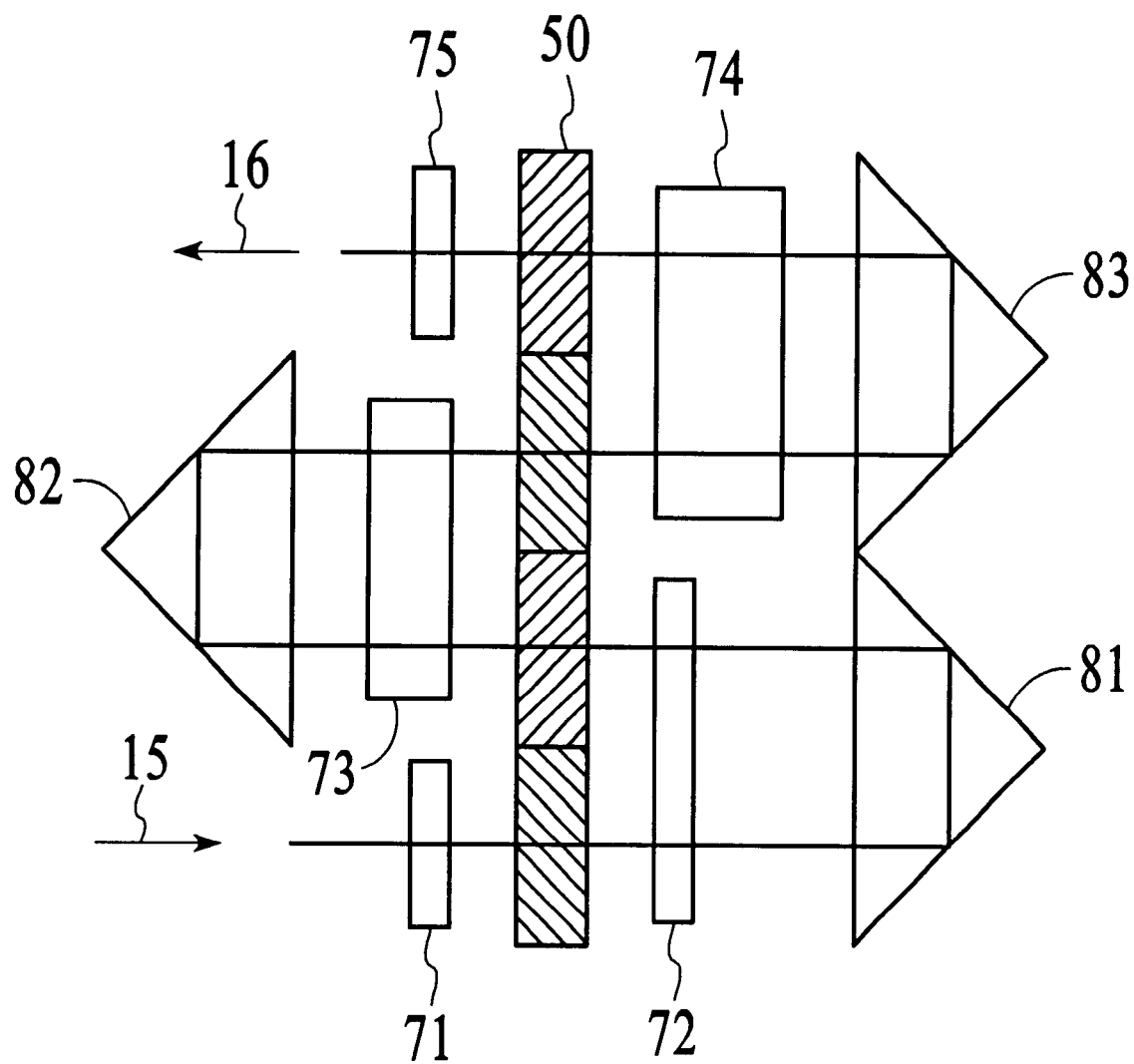
FIG. 6 illustrates a sixth preferred embodiment of the digital DGD controller in accordance with the present invention.

FIG. 6 illustrates a sixth preferred embodiment of the digital DGD controller in accordance with the present invention. The digital DGD controller 600 comprises a single polarization modulator 50 with multiple pixels. Each of a plurality of birefringent plates 71–75 is optically coupled to one or more of the pixels of the polarization modulator 50. A plurality of right-angle prisms 81–83 optically coupled to the birefringent plates 71–75 fold the optical path of the input beam 15 through the birefringent plates 71–75 and each pixel of the polarization modulator 50. The optical path is folded such that the input beam 15 passes through each of the birefringent plates 72, 73, and 74 twice. Each pixel can be controlled independently to determine the DGD of the following birefringent plate. Because of the double pass thorough the birefringent plates 72–74, the size of the controller 600 is reduced.

Figure 7:
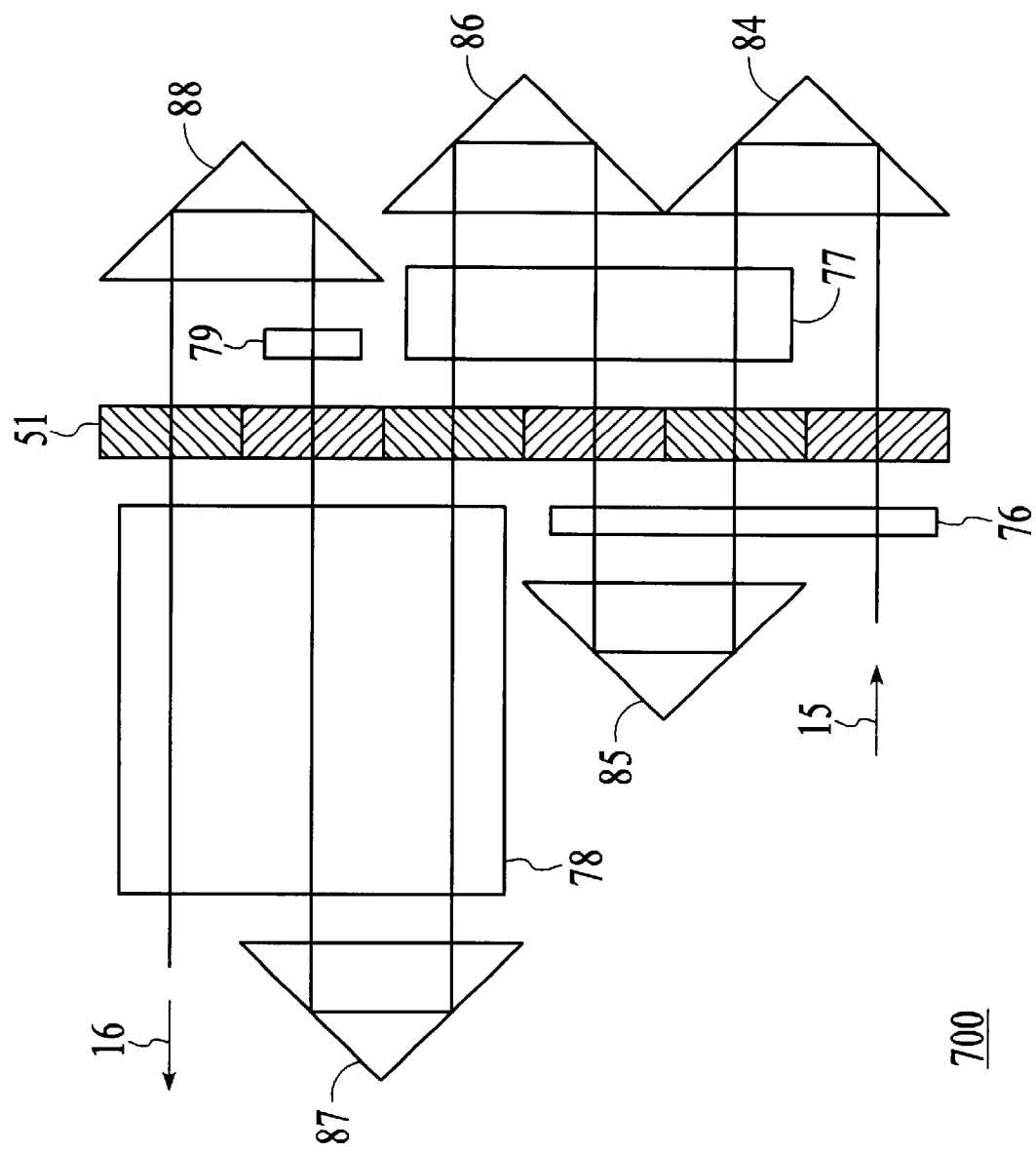
FIG. 7 illustrates a seventh preferred embodiment of the digital DGD controller in accordance with the present invention.

FIG. 7 illustrates a seventh preferred embodiment of the digital DGD controller in accordance with the present invention. The digital DGD controller 700 comprises a single polarization modulator 51 with multiple pixels configured to be independently controlled. Each of a plurality of birefringent plates 76–79 is optically coupled to one or more of the pixels. A plurality of right-angle prisms 84–88 fold the optical path of the input beam 15 such that it passes through the birefringent plates 76, 77, and 78 three times each. The thickness of each of the birefringent plates 76–79 is illustrated as increasing by a power of 4 instead of 2, as in previous embodiments. By using multiple passes through the birefringent plates 76–78, an increase in power is provided without the need to increase the number of birefringent plates. In addition, the size of the controller 700 is further reduced.

Figure 8:
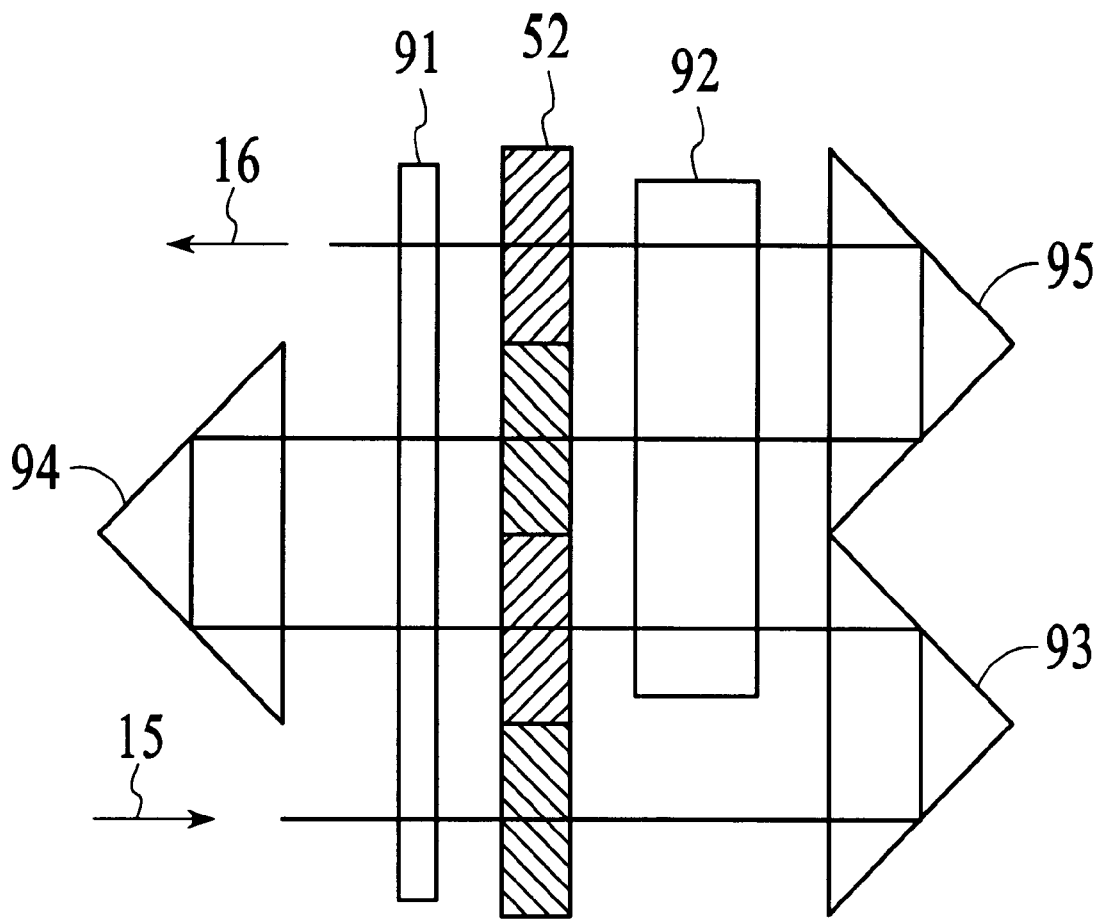
FIG. 8 illustrates an eighth preferred embodiment of the digital DGD controller in accordance with the present invention.

FIG. 8 illustrates an eighth preferred embodiment of the digital DGD controller in accordance with the present invention. The digital DGD controller 800 comprises a single polarization modulator 52 with multiple pixels configured to be independently controlled, birefringent plates 91 and 92 optically coupled to one or more pixels, and right-angle prisms 93–95 for folding the optical path of the input beam 15 such that it makes multiple passes through the birefringent plates 91 and 92. The controller 800 provides five stages with only two birefringent plates 91 and 92, achieving seventeen levels. A compact design is thus achieved for the controller 800.

Figure 9:
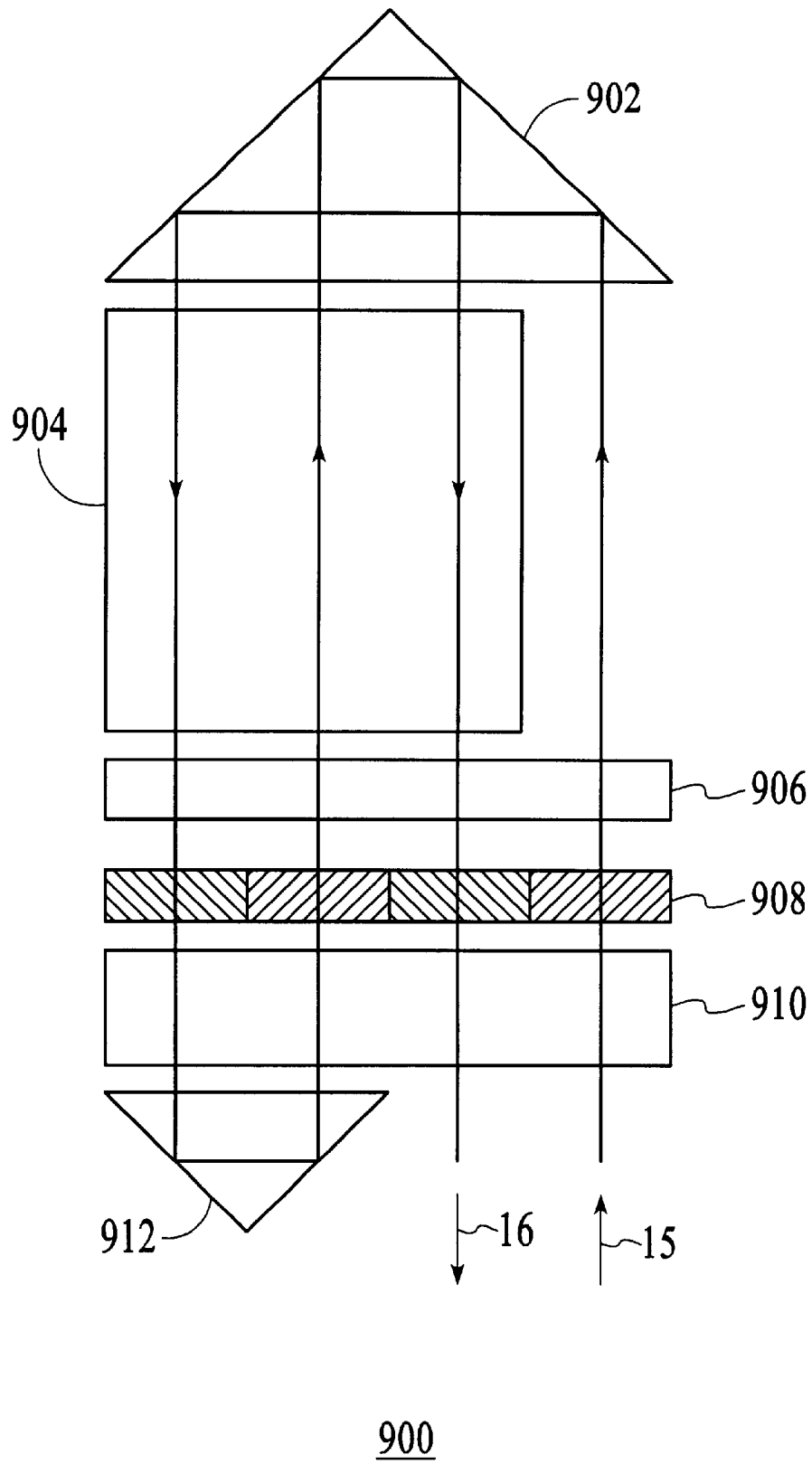
FIG. 9 illustrates a ninth preferred embodiment of the digital DGD controller in accordance with the present invention.

FIG. 9 illustrates a ninth preferred embodiment of the digital DGD controller in accordance with the present invention. The digital DGD controller 900 comprises a single polarization modulator 908 with multiple pixels configured to be independently controlled, birefringent plates 906 and 908 optically coupled to one or more pixels, another birefringent plate 904, and right-angle prisms 902 and 912 for folding the optical path of the input beam 15 such that it makes multiple passes through the birefringent plates 904, 906, and 910. A compact design is thus achieved for the controller 900.

Although the preferred embodiments are described above with the illustrated number of stages, one of ordinary skill in the art will understand that the controllers can have any number of stages without departing from the spirit and scope of the present invention.

Although the present invention is described above with free-space optics, other optical technologies may be used without departing from the spirit and scope of the present invention. For example, planar waveguide technology, integrated fiber systems using high-birefringence fibers, and mico-electromechanical systems (MEMS) can also be used. In addition, a resetable DGD controller, with the polarization modulators replaced by half-wave waveplates that can be manually rotated can also be provided without the spirit and scope of the present invention.

An improved digital differential group delay (DGD) controller has been disclosed. The DGD controller is capable of producing variable DGD used to compensate for DGD in a fiber optic link in real time. The DGD controller comprises one or more sets of a polarization modulator optically coupled with a fixed delay component, such as a birefringent plate. Each set provides an amount of DGD compensation. By controlling the number of stages in the controller, the amount of DGD compensation provided by each stage, and which stages are placed in the ON state, the total amount of DGD compensation provided by the digital DGD controller can be varied.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A digital differential group delay controller, comprising:
    a first stage comprising:
        a first polarization modulator, and
        a first birefringent plate optically coupled to the first polarization modulator, wherein the first birefringent plate is configured to add a first delay to a first polarization of an input optical signal; and
    a second stage, comprising:
        a second polarization modulator optically coupled to the first birefringent plate at a side opposite to the first polarization modulator, and
        a second birefringent plate optically coupled to the second polarization modulator at a side opposite to the first birefringent plate, wherein the second birefringent plate is configured to add a second delay to the first polarization of the input optical signal.

2. The controller of claim 1, wherein the second delay is a multiple of the first delay.

3. The controller of claim 1, wherein the first polarization modulator comprises a first state and a second state, wherein the first polarization modulator in the first state rotates the first and a second polarization of the input optical signal by approximately 90 degrees, wherein the first polarization modulator in the second state does not rotate the first or the second polarization of the input optical signal.

4. The controller of claim 1, wherein the second polarization modulator comprises a first state and a second state, wherein the second polarization modulator in the first state rotates the first and a second polarization of the input optical signal by approximately 90 degrees, wherein the second polarization modulator in the second state does not rotate the first or the second polarization of the input optical signal.

5. The controller of claim 1, further comprising an offset stage, comprising:
    a third birefringent plate optically coupled to the first polarization modulator at a side opposite to the first birefringent plate; and
    a third polarization modulator optically coupled to the third birefringent plate at a side opposite to the first polarization modulator,
    wherein the third birefringent plate is configured to add a third delay to the first polarization of the input optical signal, wherein the third delay is approximately equal to the first delay.

6. The controller of claim 5, wherein the third polarization modulator comprises a first state and a second state, wherein the third polarization modulator in the first state rotates the first and a second polarization of the input optical signal by approximately 90 degrees, wherein the third polarization modulator in the second state does not rotate the first or the second polarization of the input optical signal.

7. The controller of claim 1, wherein the first and the second polarization modulators each comprises a first and a second pixel.

8. The controller of claim 7, further comprising:
    a first birefringent polarization beam displacer optically coupled to the first polarization modulator, wherein the first birefringent polarization beam displacer separates the first polarization and a second polarization of the input optical signal, wherein the first polarization passes through the first pixels of the first and second polarization modulators, wherein the second polarization passes through the second pixels of the first and second polarization modulators.

9. The controller of claim 8, further comprising:
    a fourth polarization modulator optically coupled to the second birefringent plate at a side opposite to the second polarization modulator, wherein the fourth polarization modulator comprises a first and a second pixel, wherein the first polarization passes through the first pixel of the fourth polarization modulator, wherein the second polarization passes through the second pixel of the fourth polarization modulator; and a second birefringent polarization beam displacer optically coupled to the fourth polarization modulator at a side opposite to the second birefringent plate, wherein the second birefringent polarization beam displacer combines the first and the second polarizations of the input optical signal into an output optical signal.

10. The controller of claim 7, further comprising:
a reflector optically coupled to the second birefringent plate at a side opposite to the second polarization modulator,
wherein the input optical signal passes through the first pixels of the first and second polarization modulators to the reflector,
wherein the reflector reflects the input optical signal to pass through the second pixels of the first and second polarization modulators.

11. The controller of claim 10, wherein the reflector comprises a right-angle prism.

12. The controller of claim 1, wherein the first polarization modulator comprises:
a fifth polarization modulator optically coupled to the first birefringent plate at a side opposite to the second polarization modulator;
a fourth birefringent plate optically coupled to the fifth polarization modulator at a side opposite to the first birefringent plate; and
a sixth polarization modulator optically coupled to the fourth birefringent plate at a side opposite to the fifth polarization modulator,
wherein the fifth polarization modulator, the fourth birefringent plate, and the sixth polarization modulator transform elliptical first and second polarizations of the input optical signal to linear first and second polarizations.

13. A digital differential group delay controller, comprising:
a polarization modulator comprising a plurality of pixels;
a plurality of birefringent plates, each optically coupled to one or more of the pixels; and
a plurality of reflectors optically coupled to the plurality of birefringent plates.

14. The controller of claim 13, wherein the plurality of reflectors each comprise a right-angle prism.

15. The controller of claim 13, wherein a first of the plurality of birefringent plates is optically coupled to each pixel at a first side of the polarization modulator,
wherein a second of the plurality of birefringent plates is optically coupled to less than all of the pixels at a second side of the polarization modulator opposite to the first side,
wherein a first of the plurality of reflectors is optically coupled to the second side of the polarization modulator and the second birefringent plate,
wherein a second of the plurality of reflectors is optically coupled to the first birefringent plate at a side opposite to the polarization modulator, and
wherein a third of the plurality of reflectors is optically coupled to the second birefringent plate at a side opposite to the polarization modulator.

16. The controller of claim 13, wherein a first of the plurality of birefringent plates is optically coupled to each pixel at a first side of the polarization modulator,
wherein a second of the plurality of birefringent plates is optically coupled to each pixel at a second side of the polarization modulator,
wherein a third of the plurality of birefringent plates is optically coupled to the first birefringent plate at a side opposite to the polarization modulator,
wherein a first of the plurality of reflectors is optically coupled to the second birefringent plate at a side opposite to the polarization modulator, and
wherein a second of the plurality of reflectors is optically coupled to the third birefringent plate at a side opposite to the first birefringent plate.

17. A digital differential group delay controller, comprising:
a first stage comprising:
a first polarization modulator, and
a first birefringent plate optically coupled to the first polarization modulator, wherein the first birefringent plate is configured to add a first delay to the first polarization of an optical signal;
a second stage, comprising:
a second polarization modulator optically coupled to the first birefringent plate at a side opposite to the first polarization modulator, and
a second birefringent plate optically coupled to the second polarization modulator at a side opposite to the first birefringent plate, wherein the second birefringment plate is configured to add a second delay to the first polarization of the optical signal; and
an offset stage comprising:
a third birefringent plate optically coupled to the first polarization modulator at a side opposite to the first birefringent plate, and
a third polarization modulator optically coupled to the third birefringent plate at a side opposite to the first polarization modulator,
wherein the third birefringent plate is configured to add a third delay to the first polarization of the optical signal, wherein the third delay is approximately equal to the first delay.

18. A digital differential group delay controller, comprising:
a first stage comprising:
a first polarization modulator comprising a first and a asecond pixel, and
a first birefringent plate is configured to add a first delay to a first polarization of an optical signal;
a second stage, comprising;
a second polarization modulator optically coupled to the first birefringent plate at a side opposite to the first polarization modulator, the second polarization modulator comprising a first and a second pixel, and
a second birefringent plate optically coupled to the second polarization modulator at a side opposite to the first birefringent plate, wherein the second birefringent plate is configured to add a second delay to the first polarization of the optical signal;
a first birefringent polarization beam displacer optically coupled to the first polarization modulator, wherein the first birefringent polarization beam displacer separates the first polarization and a second polarization of the optical signal, wherein the first polarization passes through the first pixels of the first and second polarization modulators, wherein the second polarization passes through the second pixels of the first and second polarization modulators;

a fourth polarization modulator optically coupled to the second birefringent plate at a side opposite to the second polarization modulator, wherein the fourth polarization modulator comprises a first and a second pixel, wherein the first polarization passes through the first pixel of the fourth polarization modulator, wherein the second polarization passes through the second pixel of the fourth polarization modulator; and a second birefringent polarization beam displacer optically coupled to the fourth polarization modulator at a side opposite to the second birefringent plate, wherein the second birefringent polarization beam displacer combines the first and the second polarizations of the input optical signal into an output optical signal.

19. A digital differential group delay controller, comprising:
  a first stage comprising:
    a first polarization modulator comprising a first and a second pixel, and
    a first birefringent plate optically coupled to the first polarization modulator, wherein the first birefringent plate is configured to add a first delay to a first polarization of an optical signal:
  a second stage, comprising:
    a second polarization modulator optically coupled to the first birefringent plate at a side opposite to the first polarization modulator, the second polarization modulator comprising a first and a second pixel, and
    a second birefringent plate optically coupled to the second polarization modulator at a side opposite to the first birefringent plate, wherein the second birefringent plate is configured to add a second delay to the first polarization of the optical signal; and
  a reflector optically coupled to the second birefringent plate at a side opposite to the second polarization modulator,
  wherein the input optical signal passes through the first pixels of the first and second polarization modulators to the reflectors,
  wherein the reflector reflects the input optical signal to pass through the second pixels of the first and second polarization modulators.

20. A digital differential group delay controller, comprising:
  a first stage comprising:
    a first polarization modulator,
    a first birefringent plate optically coupled to the first polarization modulator, and
    a second polarization modulator optically coupled to the first birefringent plate at a side opposite to the first polarization modulator, wherein the first polarization modulator, the first birefringent plate, and the second polarization modulator transform elliptical first and second polarizations of an optical signal to linear first and second polarizations, and
    a second birefringent plate optically coupled to the second polarization modulator, wherein the second birefringent plate is configured to add a first delay to a first polarization of the optical signal; and
  a second stage, comprising:
    a third polarization modulator optically coupled to the second birefringent plate at a side opposite to the second polarization modulator, and
    a third birefringent plate optically coupled to the third polarization modulator at a side opposite to the second birefringent plate, wherein the third birefringent plate is configured to add a second delay to the first polarization of the optical signal.

21. A system, comprising:
  an optical signal comprising a differential group delay, and
  a digital different group delay compensator, comprising:
    a first stage comprising:
      a first polarization modulator, and
      a first birefringent plate optically coupled to the first polarization modulator, wherein the first birefringent plate is configured to add a first delay to a first polarization of the optical signal, and
    a second stage, comprising:
      a second polarization modulator optically coupled to the first birefringent plate at a side opposite to the first polarization modulator, and
      a second birefringent plate optically coupled to the first birefringent plate at a side opposite to the first polarization modulator, and
      a second birefringent plate optically coupled to the second polarization modulator at a side opposite to the first birefringent plate, wherein the second birefringent plate is configured to add a second delay to the first polarization of the optical signal.

22. A method for compensating for ifferential group delay, comprising sequrntially the steps of:
  (a) placing a first polarization modulator and a second polarization modulator in a first state or a second state, wherein a polarization of an optical signal is rotated in the first state, wherein the polarization of the optical signal is not rotated in the second state;
  (b) passing the optical signal through the first polarization modulator;
  (c) adding a first delay to a first polarization of the optical signal by passing the optical signal through a first birefringent plate with a first thickness;
  (d) passing the optical signal through the second polarization modulator; and
  (e) adding a second delay to the first polarization of the optical signal by passing the optical signal through a second birefringent plate with a second thickness, wherein a total amount of added delay is determined by the first and second thickness and by the states of the first and second polarization modulators.

* * * * *